L. A. SUBERS.
BELTING.
APPLICATION FILED OCT. 17, 1910.
1,014,918. Patented Jan. 16, 1912.
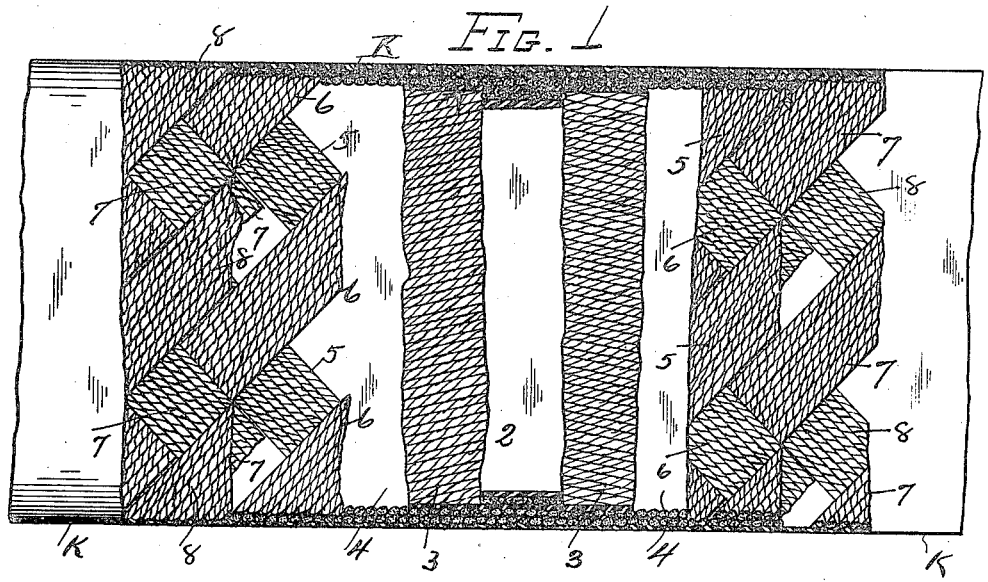
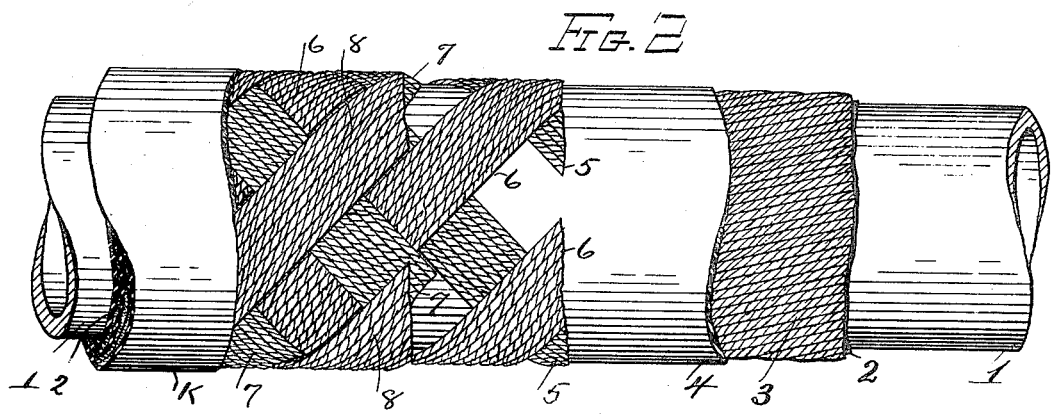
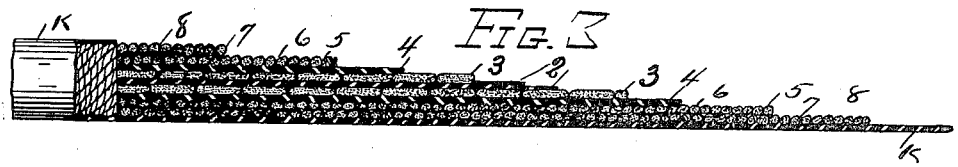
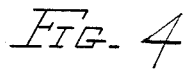
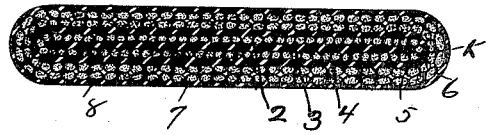
Witnesses:
Ernest Mosman.
Inventor
Lawrence A. Subers
by
Attorney

UNITED STATES PATENT OFFICE.

LAWRENCE A. SUBERS, OF CLEVELAND, OHIO.

BELTING.

1,014,918. Specification of Letters Patent. Patented Jan. 16, 1912.

Application filed October 17, 1910. Serial No. 587,630.

*To all whom it may concern:*

Be it known that I, LAWRENCE A. SUBERS, a citizen of the United States, and resident of Cleveland, in the county of Cuyahoga and State of Ohio, have invented certain new and useful Improvements in Belting, of which I hereby declare the following to be a full, clear, and exact description, such as will enable others skilled in the art to which it appertains to make and use the same.

The objects of the invention are to provide an improved form of belting which is possessed of great tensile strength combined with great flexibility and also to provide an improved method of making a belt from fabric tubing and to provide the belt with integral selvage or unbroken edges. The belt is preferably composed of a laminated-cohesive-interwound fibrous structure, unwoven and unbraided, in which the members and layers cohere in a tenacious, elastic, binding material, which may be vulcanizable.

Of the several component layers the outer fabric layer, is composed of at least four series of parallel, equally spaced, interwound fibrous members, the first and third laid series parallel to each other, and the second and fourth preferably at right angles to the first and third but parallel to each other and so wound that when compressed the members of the third series will fill the spaces between the members of first series, while the members of the fourth series fill the spaces between the second series, thus forming a two ply fabric layer. The second layer is composed of parallel cords or members closely wound or laid in a substantially longitudinal direction but at a slight angle to the sides of the belt. By using a considerable amount of the binding or adhesive material on the inside and outside of the first layer of fibrous material the fabric layers are united before vulcanizing while an outside covering of thin calendered unvulcanized rubber completes the belt, provided rubber is used. The belt is first constructed in tubular form and compressed or flattened into the form of a belt and all parts are then vulcanized together.

The invention is further described in the accompanying specifications, illustrated in the accompanying drawings and specifically pointed out in the claims.

In the accompanying drawings Figure 1 is a plan view of a portion of belting showing one layer of interwound members, one layer of substantially longitudinal members and coatings of rubber broken away to show their structure; Fig. 2 is a similar view of the same in tubular form upon a mandrel before flattening, showing one layer of interwound fabric members or cords and one layer of substantially longitudinal members or cords and the several rubber coatings in position upon the mandrel on which the fabric is wound; Fig. 3 is a longitudinal section of Fig. 1 and Fig. 4, is a transverse section of the same.

In these views, 1 in Fig. 2 is the mandrel, 2 is the heavy rubber coating on the inside of the first fibrous layer, 3 is a layer of parallel twisted cords each having a generally longitudinal direction of winding only slightly deflected from a true line parallel with the axis of the mandrel, 4 is a coating of rubber thereon, 5 is a series of parallel equally spaced bands of twisted cords or other fibrous material wound upon the rubber coating, at an angle of substantially 45°, 6 is a series of similar equally spaced bands wound crossing the first series at approximately right angles or at an angle of 135° to any longitudinal surface line in that layer, crossing this series is wound a third series 7 of similar equally spaced bands parallel to the bands 5 of the first series and arranged so as to cover up and fill the spaces between them. At 8 is a series of similar equally spaced bands parallel to the bands of the second series 6 and positioned to cover up and fill the spaces between them. The outer series is laid under a tension sufficient to compress the bands and layers together to force the several series of bands together until each space is filled, and a unitary two-ply fabric is formed, the edges of one series of bands engaging the edges of parallel lying series of bands in such a manner that the several series will not slip upon each other and hence will not be liable to abrasion or overheating from friction upon each other.

The cords and bands are laid in rubber or are previously coated with rubber before winding, the essential object being that they shall be wholly embedded in rubber so as to separate them from each other, so that they will not rub upon each other, but will be flexibly united by means of the binding material to form a unitary layer. These bands which cross each other at the angles specified give both transverse and longitudinal strength to the fabric combined with great flexibility and elasticity, so that the belting will pass over comparatively small pulleys without injury to the fabric and will prove durable in use.

The layer 3 is composed of twisted cords which are embedded in rubber and are laid in parallel lines cohering together, and are slightly deflected in direction from a true parallel to the axis of the mandrel, and hence the belt is more flexible and extensible than if they were laid absolutely parallel to said axis.

As soon as completed and an unvulcanized outer coating K is added to form the required surface for engaging the pulleys, the tube is withdrawn from the mandrel by any suitable means, or the mandrel may be a collapsible mandrel, and prior to vulcanizing it is flattened as shown in Figs. 1, 3 and 4 so as to form a belt of twice the number of layers composing the walls of the tube the coating of adhesive material on the inside layer causing it to adhere to itself. The completed belt is then vulcanized.

As shown in Fig. 1 this structure provides two layers of each class when flattened to form a belt, and the two layers of longitudinal deflected cords will cross each other at a slight angle, and being united together by means of the binding material give great tensile strength combined with great flexibility and durability.

The outer layer of crossing interlaid bands cohering together in the binding material form substantial edges, thereby protecting it from raveling or being torn, and inclose the entire belt, while permitting free flexing thereof and provides the capability of conforming to the crown of the pulley.

The practicability and utility of the device are obvious from the above stated reasons.

It is obvious that the invention is not limited to the exact construction and arrangement of fabric and rubber layers described, but modifications thereof can be made without departing from the spirit of the invention and scope of the claims. It is important however that the fabric should be elastic and inclose the tube before flattening and that it should have great tensile strength combined with great flexibility in use.

It is obvious that any suitable binding adhesive material may be used, which may not be vulcanizable in its character.

Having described the invention what I claim as new and desire to secure by Letters Patent is:

1. In a belt, a tubular fabric and a lining therefor of adhesive vulcanizable material, and a longitudinal layer therein of parallel twisted cords laid at a slight angle to the sides of the belt to provide flexibility thereof.

2. In a belt, a tubular layer of fibrous members crossing each other around the tube, a tubular layer of slightly inclined longitudinally directed members comprising parallel cords laid at an angle to the sides of said belt, a tubular lining of adhesive vulcanizable material, an intervening rubber layer between the fibrous layers and a binding for said fibrous members of adhesive vulcanizable material.

3. In a belt, in combination, a tubular layer composed of crossing equally spaced parallel bands of fibrous material forming two plies, the spaces between said bands filled by succeeding bands until all spaces are covered, a tubular layer comprising parallel cohering cords laid at an angle to the sides of the belt, the parallel cords in one side of said tubular layer crossing the cords in the other side, and an intervening layer of rubber between said layers, a rubber lining and an outer coating.

4. As an article of manufacture, a belt, comprising a flattened tube composed of interwound groups of parallel twisted close lying cords, flattened to form selvage edges, and a flattened layer of parallel twisted closely lying cords longitudinally directed and adhering together, said parallel twisted cords laid at an angle to said edges.

In testimony whereof, I hereunto set my hand this 14th day of October 1910.

LAWRENCE A. SUBERS.

In presence of—
  ERNEST MOSMAN,
  S. L. EXLINE.